UNITED STATES PATENT OFFICE.

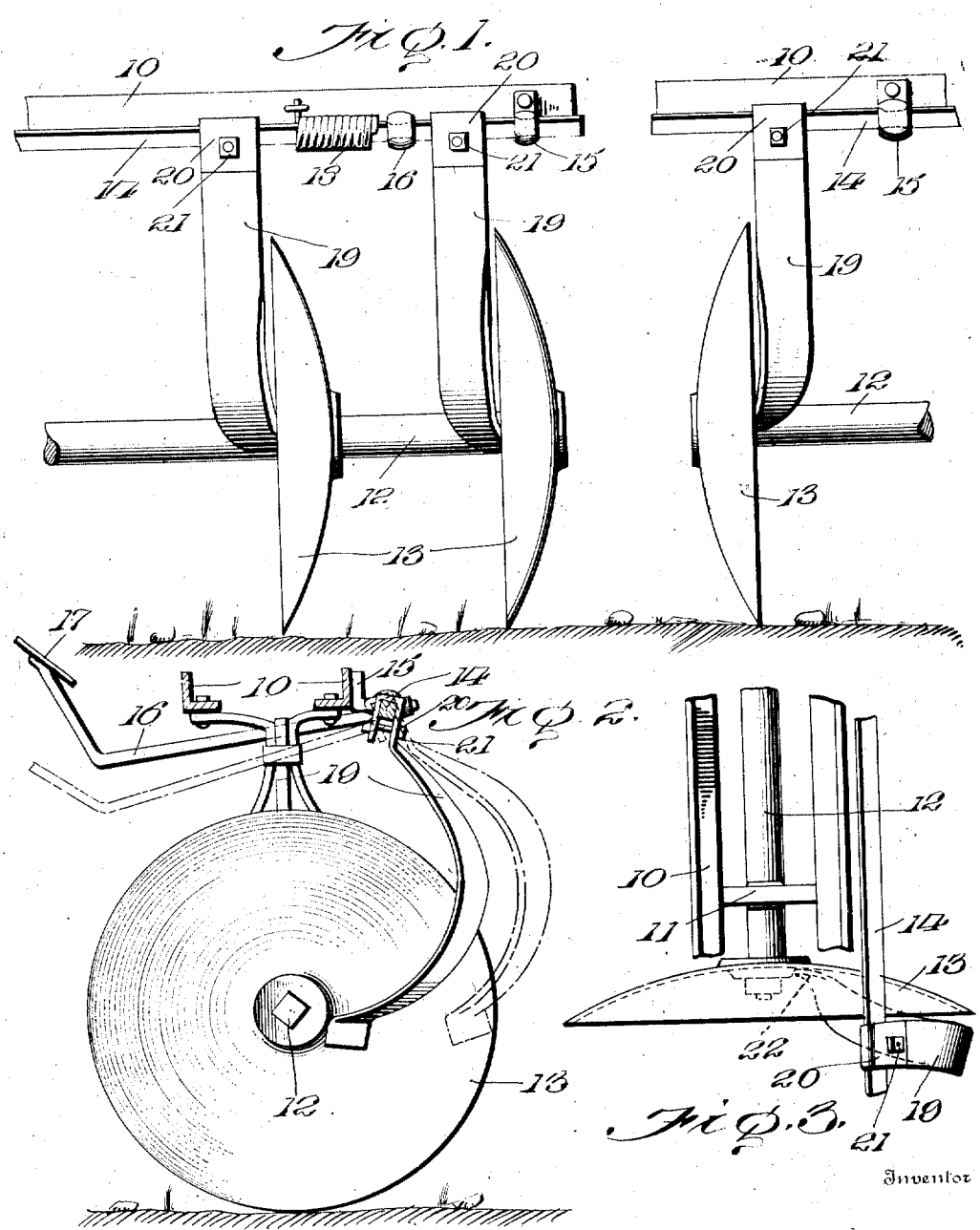

ARTHUR R. MARKLEY, OF ESTHERVILLE, IOWA.

DISK-SCRAPER.

990,576.    Specification of Letters Patent.    Patented Apr. 25, 1911.

Application filed September 7, 1909. Serial No. 516,328.

*To all whom it may concern:*

Be it known that I, ARTHUR R. MARKLEY, a citizen of the United States, residing at Estherville, in the county of Emmet and State of Iowa, have invented certain new and useful Improvements in Disk-Scrapers, of which the following is a specification.

This invention relates to disk harrows and refers particularly to an improved scraper to be applied to the same.

An object of this invention is to so position and arrange the scraper upon a harrow frame as to enable the operator to swing the scraper so as to move it radially with respect to the disk and to thereby effect the scraping of the disk over its entire concaved surface.

The invention has for another object the provision of an arrangement of scrapers upon the harrow frame whereby a plurality of scrapers may be actuated simultaneously in order to clear all of the disks of the harrow at the same time and under the operation of one lever.

The invention has for a further object the peculiar disposition of a cutting blade on the scraper whereby the same is presented diagonally to the radius of the disk to effect the removal of mud or trash by the exerting of but a slight pressure upon the scraper thereby effecting a mechanism which will be relieved of all undue strain during its operation.

For a full understanding of the invention and the merits thereof, and also to acquire a knowledge of the details of construction, and the means for effecting the result, reference is to be had to the following description and accompanying drawings, in which;

Figure 1 is a rear elevation of a fragmentary view of the opposite ends of a harrow having the improved scrapers applied thereto; Fig. 2 is a transverse section through the harrow disclosing the improved scraper applied thereto, and showing in dotted lines the same after operation; and Fig. 3 is a top plan view of the improved scraper.

Corresponding and like parts are referred to in the following description and indicated in all the views of the drawing by the same reference characters.

Referring to the drawings, the numeral 10 designates the frame of a harrow which is disclosed in the present drawings as being formed of a pair of angle irons arranged in parallel and provided with depending supports 11 in the lower ends of which is journaled a transverse shaft 12. Upon the shaft 12 are arranged a plurality of disks 13 which are disposed in two sets having their concaved faces turned oppositely and outwardly from one another according to the side of the frame 10 upon which the same are mounted. The frame 10 is provided with an operating shaft 14 which is formed rectangularly in cross section and having circular bearing faces formed at spaced intervals throughout the same for the reception of the supporting arms 15 which are rearwardly extended from the frame 10. The operating shaft 14 is provided with a lever 16 which is extended forwardly from an intermediate point of the same and beneath the harrow frame 10, where the lever 16 is turned upwardly to form a pedal 17 by which the lever 16 is adapted to be depressed in order to rotate the shaft 14. The shaft 14 is provided with a spring 18 mounted at a convenient point thereon, preferably at a central point adjacent the lever 16, one end of the spring 18 being rigidly connected to the shaft 14, while the opposite end thereof is extended to the frame 10 and secured thereto. The spring 18 is mounted in such relation to the shaft 14 that the shaft 14 is normally held in a forwardly turned position to raise the lever 16 and to hold the pedal 17 in an upward position.

Mounted upon the shaft 14 are a plurality of scraper blades 19, one for each of the harrow disks. These blades are formed of relatively narrow strips of resilient sheet material bent at their upper ends as at 20 for engagement about the shaft 14 and against the sides thereof to rigidly support the blades and form a U-shaped clip embracing the shaft 14, this clip being secured to the shaft 14 by clamping bolts 21. It is to be noted that the upper ends of the blades are disposed in a plane parallel to the plane of the rock shaft. The blades are bowed in form and extend rearward and downward past the edge of the disk and then are twisted or deflected inward toward the concave face of the disk and toward the axis thereof. The blades 19 are so twisted that the lower end of each blade is parallel to the face of the harrow disk. At the lower end the blade is downwardly bent at approximately a right angle to form an angular terminal portion, this terminal portion acting as a scraper and having a cutting edge or scraping edge substantially horizontal. This downwardly turned portion which forms the scraper is designated 22 and is adapted as the disk rotates to scrape off any adhering earth or other foreign matter. As the disk rotates this foreign matter scraped off by the scraping portion 22 will be carried upward and will contact with the bowed face of the scraper and will be deflected by said face, not only upward and outward but also laterally away from the concave face of the disk, thus entirely clearing the disk of foreign matter and preventing the clods of earth or mud from again falling upon the disk or falling upon the axle thereof and thus clogging.

In order to operate the scraper the lever 16 is depressed by means of the pedal 17 which will cause the blade to move rearwardly and will cause the scraping portion 22 thereof to move radially across the inner face of the disk so that every portion of the inner face of the disk will be cleaned. Furthermore, it is noted that by reason of the twist given to the spring plate that the scraping portion 22 thereof will be forced resiliently into contact with the inner face of the disk, and that it does not require any manual action in order to force the scraper into contact with the disk.

In Fig. 2 of the drawings is disclosed in dotted lines the position assumed by the blades 19 when the lever 16 is depressed, and it will be noted that the cutting edge 22 travels substantially radially from the center of the disk and is engaged constantly against the concaved side of the same owing to the resilient formation of the blades 19.

The scraping plate or portion 22 assumes the diagonal position shown in dotted lines, during the turning of the shaft 14 and thus presents a cutting edge which has the advantage of a sliding side movement, thereby insuring the dislodging of the adhesive substances engaged upon the disks.

The feature of curving the blades substantially circularly toward the center of the disks is believed to be a decided advantage, insomuch that the matter collected upon the disks 13 is thrown backwardly and is not permitted to drop upon the disks from above, as is common with the scrapers now in use, whereby the clogging of the disks is eliminated as the mud or trash is deflected by the curvature of the blades 19.

Having thus described the invention what is claimed as new is:

1. The combination with a concavo-convex harrow disk and a frame supported thereon, of a scraper therefor comprising a rock shaft mounted on the frame, a lever for oscillating the rock shaft and a resilient blade, the upper end of which is attached to the rock shaft and is disposed in a plane parallel to the axis of the disk, said blade being bowed rearward and then inward toward the concave face of the disk, the lower portion of the blade being twisted relatively to the upper portion and the lower extremity of the blade being angularly bent to afford a flat terminal scraping member contacting with the inner face of the disk and having a scraping edge extending approximately radial to the disk.

2. The combination with a concavo-convex harrow disk and a frame supported thereon, of a scraper comprising a rock shaft mounted on the frame, a lever for moving the rock shaft, and a resilient blade, the upper end of which is attached to the rock shaft, said upper end being disposed in a plane parallel to the axis of the disk, said blade being bowed rearward and extended toward the central portion of the disk and being gradually twisted to bring its lower end into contact with the face of the central portion of the disk, the lower end of the blade being formed with a scraper whose edge extends approximately radial to the disk, the upper end of the blade being laterally adjustable upon the rock shaft, whereby the pressure of the scraper against the harrow disk may be adjusted.

3. The combination with a concavo-convex harrow disk and a frame supported thereon, of a scraper comprising a rock shaft mounted on the frame, a lever for moving the rock shaft, and a resilient blade, the upper end of which is bent to form a clip engaging over the rock shaft, said upper end being disposed in a plane parallel to the axis of the disk, the blade being bowed rearward and then extending inward toward the central portion of the disk and being gradually twisted to bring its lower end into contact with the face of the disk, the lower end of the blade being bent into a plane approximately parallel to the plane of the disk to form a scraper having an edge extending approximately radially to the disk, and a bolt passing through the clip formed at the upper end of the scraper and adjustably engaging the scraper upon the rock shaft.

In testimony whereof I affix my signature in presence of two witnesses.

ARTHUR R. MARKLEY. [L. S.]

Witnesses:
P. H. PAULSEN,
BYRON M. COON.